(Model.)

F. M. LEAVITT.
VENDING APPARATUS.

No. 397,297.  Patented Feb. 5, 1889.

4 Sheets—Sheet 1.

WITNESSES:
Otto Beyer
Geo. D. Mitchell

INVENTOR:
Frank M. Leavitt,
BY John C. Kennie
ATTORNEY (Model.)

F. M. LEAVITT.
VENDING APPARATUS.

No. 397,297.　　　　Patented Feb. 5, 1889.

WITNESSES:
Otto Beyer
Geo. D. Mitchell

INVENTOR:
Frank M. Leavitt
BY John C. Pennie
ATTORNEY.

(Model.)
F. M. LEAVITT.
VENDING APPARATUS.
No. 397,297. Patented Feb. 5, 1889.
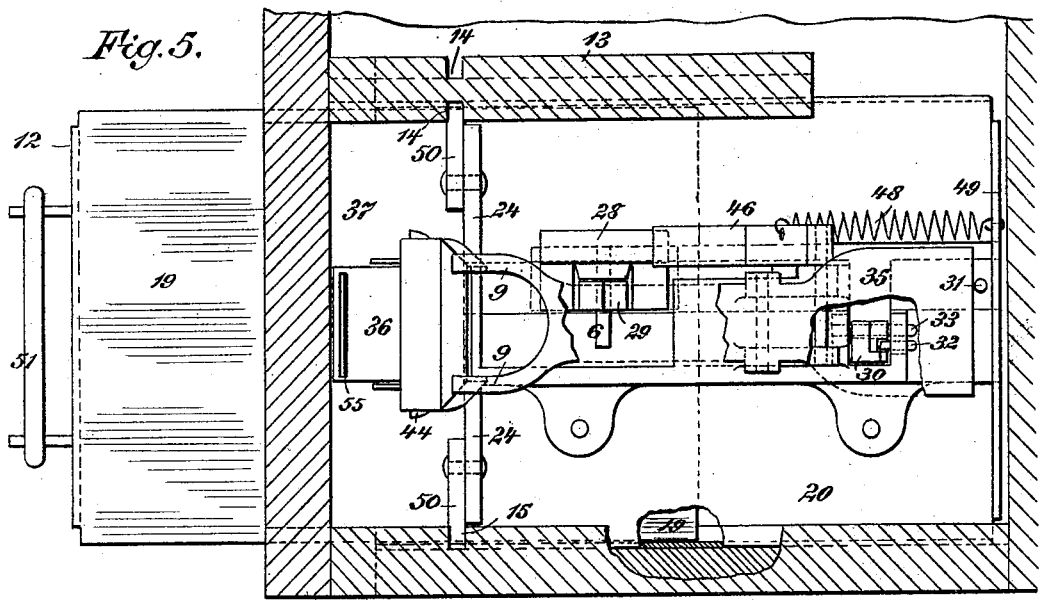
Fig. 5.
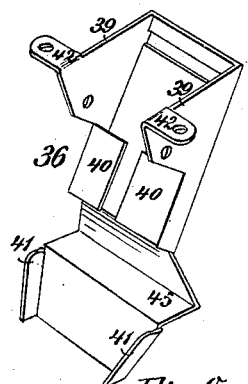
Fig. 7. Fig. 6. Fig. 9.
Fig. 8. Fig. 10.
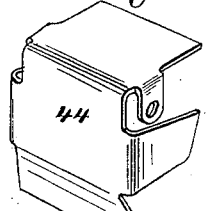
WITNESSES:
Otto Beyer
Geo. D. Mitchell
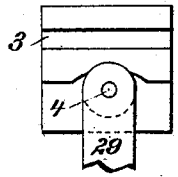
Fig. 11.
INVENTOR:
Frank M. Leavitt
BY John Kennie
ATTORNEY.

(Model.)
F. M. LEAVITT.
VENDING APPARATUS.
No. 397,297. Patented Feb. 5, 1889.
4 Sheets—Sheet 4.
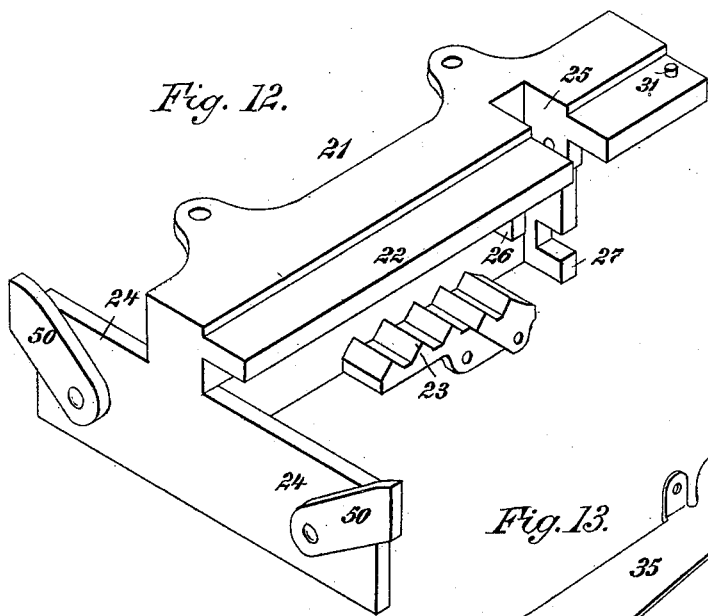
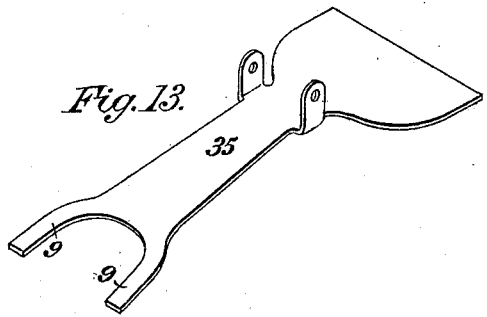
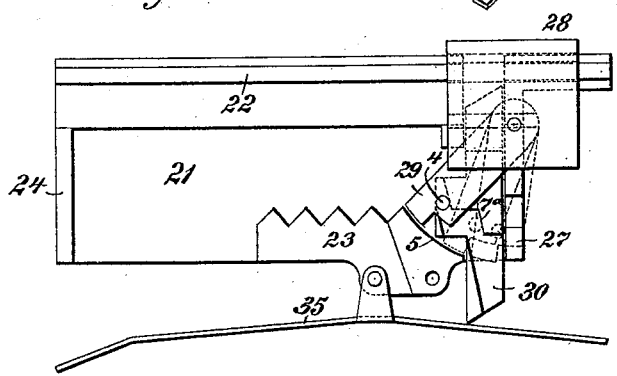
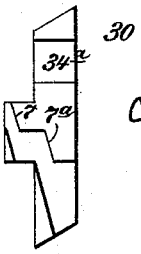
WITNESSES:
Otto Beyer
Geo. D. Mitchell
INVENTOR:
Frank M. Leavitt,
BY
John C. Kennie.
ATTORNEY.

UNITED STATES PATENT OFFICE.

FRANK M. LEAVITT, OF BROOKLYN, NEW YORK, ASSIGNOR TO THE AUTOMATIC SELLING MACHINE COMPANY, OF SAME PLACE.

VENDING APPARATUS.

SPECIFICATION forming part of Letters Patent No. 397,297, dated February 5, 1889.

Application filed December 8, 1887. Serial No. 257,323. (Model.)

*To all whom it may concern:*

Be it known that I, FRANK M. LEAVITT, of Brooklyn, in the county of Kings and State of New York, have invented a new and Improved Coin-Controlled Vending-Machine, of which the following is a full, clear, and exact description.

This invention relates to that class of machines wherein articles or packages of goods are stored in a manner such that they may be withdrawn upon the deposit of a coin of specified value.

The present invention consists in certain improvements upon the coin-controlled vending-machine shown and described in Letters Patent No. 384,770, granted to me June 19, 1888.

The present invention consists, chiefly, in the mechanism for locking the package-drawer and for releasing the same on the deposit of a coin, which with the other improvements will be hereinafter more fully set forth.

Reference is to be had to the accompanying drawings, forming a part of this specification, in which similar figures of reference indicate corresponding parts in all the views.

Figure 2:
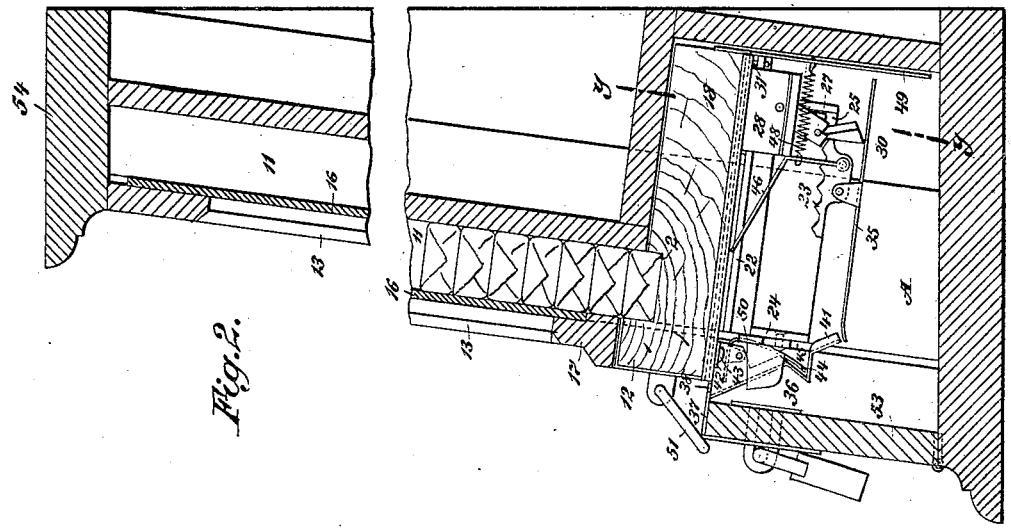
Figure 1:
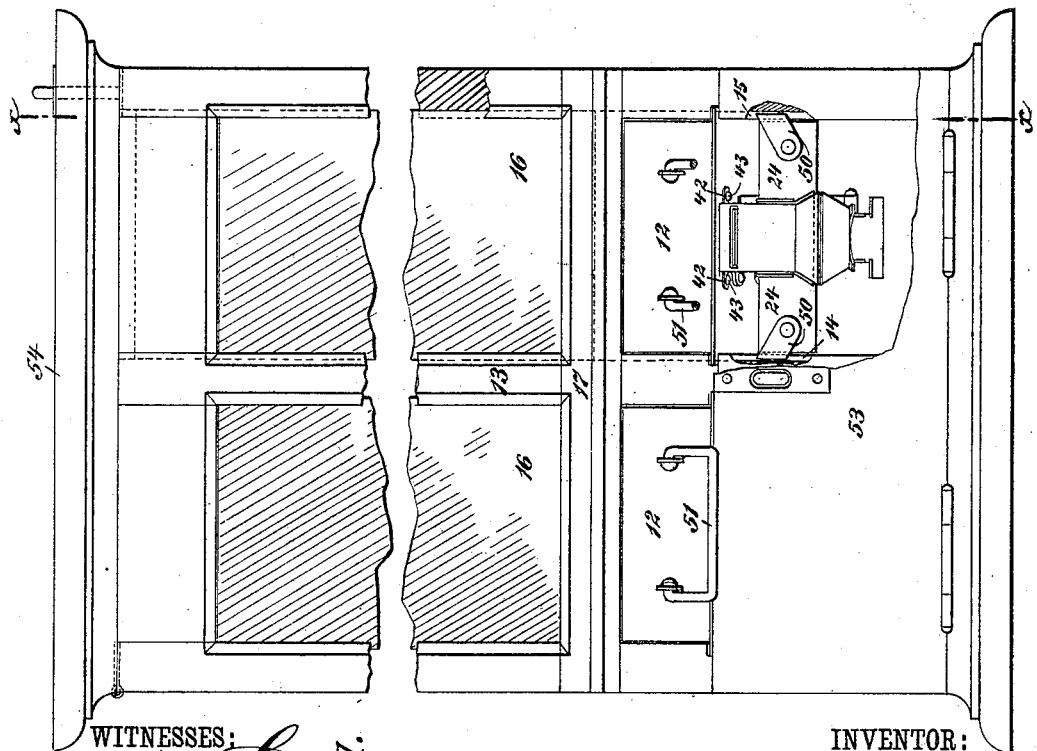
Figure 3:
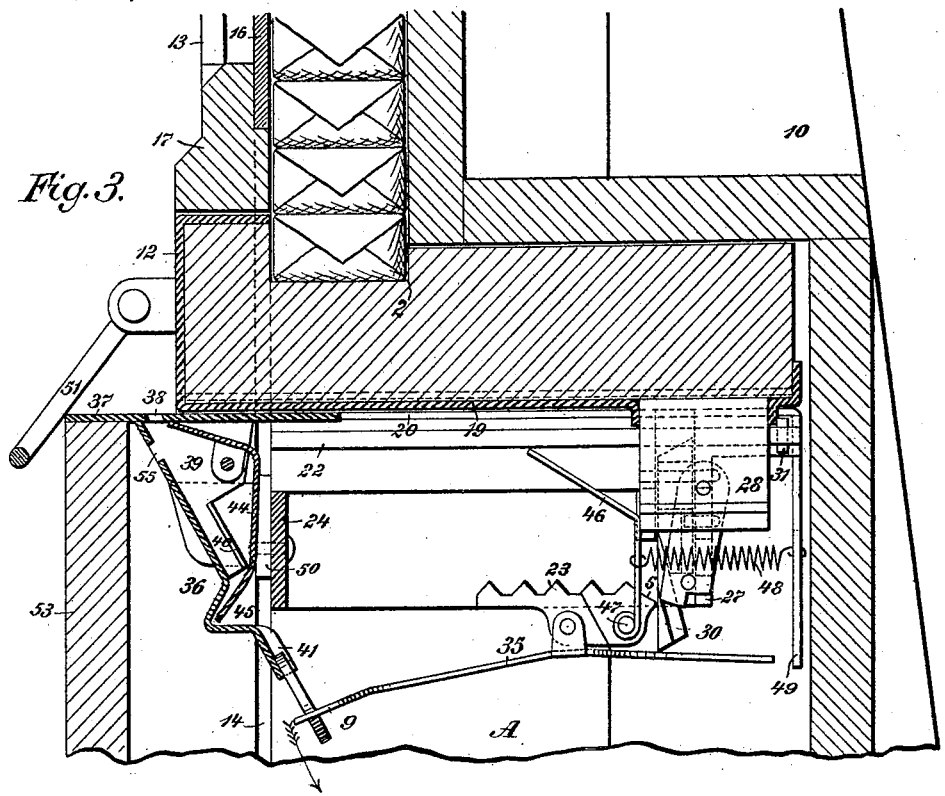
Figure 4:
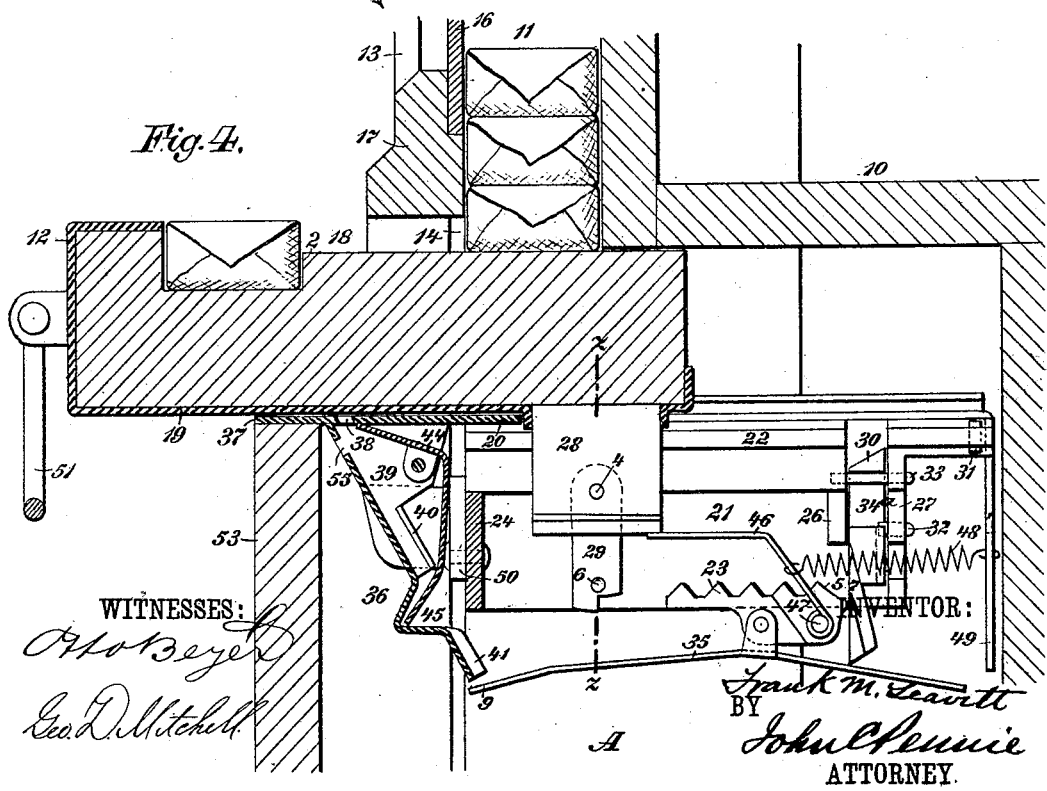

Figure 1 is a front elevation of my improved vending-machine, parts being broken away. Fig. 2 is a cross-sectional elevation taken on line $x\ x$ of Fig. 1. Fig. 3 is an enlarged sectional view of the drawer or slide and its locking mechanism, the parts being represented as they appear just after the deposit of a coin, but before the drawer or slide has been pulled out. Fig. 4 is a similar view, the parts, however, being shown as they appear after the drawer has been drawn out to enable the purchaser to take the goods. Fig. 5 is an inverted plan view of the drawer or slide and its connections, parts being broken away and the drawer or slide being shown in its open position. Fig. 6 is a rear view of the locking mechanism, the view being in partial section upon a line corresponding with the line $y\ y$ of Fig. 2. Fig. 7 is a detail perspective view of the coin-way or chute. Fig. 8 is a detail perspective view of the escapement-guard. Fig. 9 is a detail perspective view of the pawl-tripping slide. Fig. 10 is a sectional detail view taken on line $z\ z$ of Fig. 4. Fig. 11 is a detail view illustrating the connection of the gravity fly or pawl. Fig. 12 is a perspective view of the way-block. Fig. 13 is a perspective view of the pawl-tripping lever. Fig. 14 is a side view of a modified construction, and Fig. 15 is a detail view of the modified form of pawl-tripping slide employed in connection with the construction in Fig. 14.

In the drawings above referred to I have shown a case or cabinet, 10, in which there are two article or package receptacles, 11, and two reciprocating drawers or slides, 12; but I desire it to be understood that any number of such receptacles and drawers or slides could be employed. In the specific construction shown the case 10 is provided with a central partition, 13, in which there are formed substantially vertical and continuous grooves 14, similar grooves 15 being formed in the side walls of the case, and these grooves serve not only to hold glass-panels 16, which constitute the front of the package-receptacles 11, but also as recesses for the reception of the catches by which the drawers or slides and their attachments are held in place, this arrangement materially simplifying the construction.

The weight of the panels 13 is supported by a cross-bar, 17, which is arranged just above the reciprocating drawers or slides. The drawer shown in the drawings is preferably made of a block, 18, formed with a recess, 2, and secured to a plate, 19, having upturned ends, between which the block rests, the edges of the plate extending beyond the sides of the block to enter grooves or ways formed by turning over the edges of a base-plate, 20, upon which the plate 19 rests.

The location and construction of the package-drawer are substantially the same as in my above-named patent, with one exception. In my said patent the upper surface of the rear portion of the drawer, which constitutes a platform on which the packages in the package-receptacle rest when the drawer is pulled out, is in the same plane as the upper surface of the front portion of the drawer, so that the front and rear walls of the recess in the drawer are of the same height, which is substantially equal to the thickness of one package. In the present machine, however, the rear or platform portion of the drawer is not as high as the front portion of the drawer, so that the rear wall of the recess is of less height than that of the front wall, and less in height than the thickness of a package. This construction is advantageous, since owing to it the package-drawer cannot be pushed back into place until the package in the recess in the drawer has been removed, so that a purchaser must take the package to which he is entitled before another coin is deposited. This arrangement also prevents any obstruction of the drawer due to the packages being of slightly irregular thicknesses, whereas in the patented construction if the package in the recess should be of less than the normal thickness the next superimposed package would lock the drawer and prevent its being opened.

To the under side of the base-plate 20, I secure a casting, 21, formed with a laterally-extending rib, 22, a laterally-extending rack, 23, that is below the rib, side arms or projections, 24, and a vertical way, 25, the way proper being in the body of the casting, but being extended laterally by ribs 26 and 27, as shown in Figs. 4 and 12.

To the plate 19, I connect a block, 28, in which there is formed a groove, 3, that is entered by the rib 22, and this block serves as the support for a gravity pawl or fly, 29, the gravity-pawl being mounted to swing on a pin, 4, as is clearly shown in the drawings. As the reciprocating drawer or slide 12 is drawn forward or pushed backward, the gravity-pawl 29 travels over the teeth of the rack 23, and engages such teeth in a manner such that if the drawer be started in either direction it must be carried to the end of its path before the direction of its movement can be changed, this being necessary in order that the gravity-pawl may swing clear of the rack, as will be readily understood.

Upon the completion of the forward movement of the drawer the gravity-pawl swings to the position in which it is shown in Fig. 4; but upon the completion of the inward movement of the drawer it is necessary that the gravity-pawl be held against the last inclined face, 5, of the rack 23, and to so hold the gravity-pawl I provide it with a pin or projection, 6, which strikes against the inclined face 7 of a gravity-pawl-tripping slide, 30, just as the slide or drawer comes to rest against a stop, 31, that is carried by the rib 22.

The pawl-tripping slide 30 is guided within the way 25 by a pin, 32, which rides in a vertical groove, 34, and the range of motion of the block is limited by a pin, 33, which is held by the ribs 26 and 27 and rests within a recess, 34ª, formed in the side face of the slide.

From the construction described it will be seen that while the lower end of the gravity-pawl is held against the face 5 of the rack 23 it will be impossible to open the drawer, but that if the pawl-tripping slide 30 be raised so as to allow the gravity-pawl to swing clear of the rack the drawer may be pulled out to the position in which it is shown in Fig. 4. To provide for the tripping of the pawl-tripping slide 30, I pivotally connect a lever, 35, to the projection upon which the rack 23 is formed, the upper face of the inner arm of this lever normally resting against the lower end of the pawl-tripping slide 30, while the outer or forward end, which is formed with fingers 9, projects to a point just beneath a coin-chute, 36, which is connected to the extending end 37 of the base-plate 20 in a position such that it will register with a coin-slot, 38, formed in said extending end. This chute 36 is preferably formed from a sheet-metal blank that is cut and bent to the form shown best in Fig. 7, wherein there is represented a chute having side flanges, 39, an upper set of guiding-flanges, 40, a lower set of inclined guiding-flanges, 41, and ears 42, through which the supporting-rivets 43 are passed, as shown in Fig. 1. To the flanges 39, I pivotally connect an escapement-guard, 44, which normally rests in the position in which it is represented in the drawings—that is, with its lower arm within a recess, 45, formed in the chute 36 by bending the body of the metal forming said chute outward and then inward to about the form illustrated.

To insure the return of the drawer 12 to the position in which it is shown in Fig. 3—that is, to its full inward line of travel—I provide a swinging angular arm, 46, that is loosely mounted on a stud, 47, and to this arm I connect a retracting-spring, 48, which in turn is connected to a leaf, 49, bent down from the base-plate 20, the spring acting to hold the upper free portion of the lower length of the swinging arm against and in engagement with the forward face of the block 28, and thus forcing the drawer against the stop 31. The parts just described are so mounted and proportioned that as the drawer is pulled out the swinging arm 46 will be carried forward until its upper length rests flat against the under face of the block 28; but just before the drawer reaches its inner position the forward edge of the block will pass over the angle in the arm 46, so that the lower length of the arm will be brought to bear against the lower forward edge of the block 28, and the spring will then act to throw the drawer home. It will thus be seen that the free end of the swinging spring-actuated arm 46 is in operative engagement with the reciprocating slide or drawer only when the same is at and near its rearward position, so that the retracting-spring acts upon the slide or drawer to retract the same only during the latter portion of its rearward movement.

To each of the arms 24, I pivotally connect a catch, 50, and to the front of the drawer I secure a handle, 51. In addition to the vertical grooves in which the panels 16 are held, I form horizontal grooves 52 in the partition 13 and in the side walls of the case, said grooves 52 being arranged to receive the overturned edges of the base-plate 20 when the grooves are placed within the case. After the drawers and their supports have been slid within the case the catches 50 are turned down into the grooves 14 and 15, and a door, 53, which closes the coin-chamber A, is turned up and locked to place, as shown. By this arrangement I provide for the removal of any particular operating mechanism, should such mechanism become disorganized.

In operating the machine above described, the drawers 12 and their attachments are placed, as shown in the drawings, with their recesses 2 just below the package-receptacles 11, which receptacles are then filled with the goods to be sold, the panels 16 being raised at the time of filling. After the receptacles have been filled the top of the case, which is shown at 54, and which is hinged to the case, is closed and locked to place. All parts having been arranged as described, if a coin of the prescribed value be dropped into the coin-slot 38, which is just large enough to receive said coin, it will pass downward through the chute 36, striking on its way the lower arm of the escapement 44 and tilting such escapement, so that its upper arm will pass over the coin-chute and into a slot, 55, formed in the blank from which the chute is made. Passing downward through the chute, the coin will strike upon the fingers 9 of the lever 35, carrying said lever in the direction of the arrow shown in connection therewith in Fig. 3; but if a coin of less diameter than the one in connection with which the machine is designed to operate be dropped into the slot 38, it will pass between the fingers 9 without tripping the lever 35. As soon as the lever moves, as described, the pawl-tripping slide 30 will be raised, so that its inclined face 7 will be carried free of the gravity-pawl pin or projection 6, and the pawl will fall to the position shown in Fig. 3, thus permitting the drawer 12 to be pulled out to the position shown in Fig. 4—that is, to a position so that the package of goods within its recess 2 may be taken by the person depositing the coin, the column of packages within the receptacle 11 being supported by the block 18, as shown. When the drawer is returned to its normal position, the projection 6 of the gravity-pawl 29 will strike against the inclined face 7 of the pawl-tripping slide 30, and the gravity-pawl will thus be held in engagement with the rack, as before described, the gravity-pawl and rack coacting to insure a full movement in each direction before the direction of movement can be reversed, as has also been before described. The escapement-guard 44 prevents the tripping of the lever 35 by means of a wire or knife-blade, for if a wire or knife-blade should be inserted through the slot 38 it would strike against the lower escapement-arm, and to pass such arm would rock the escapement so that its upper arm would bear against the wire and all further movement of the escapement would be stopped, the downward movement of the wire or knife-blade being checked by the horizontal ridge below the recess 45. If a coin tied to a string should be inserted, it could not be withdrawn after having tripped the lever 35, as it would strike against the lower arm of the escapement, nor could it be again seated on the fingers 9 of the lever 35. To prevent a repeated opening of the drawer should an irregular coin be deposited and lodge between the fingers 9, I form the pawl-tripping slide 30 with a flange, c, against the forward face of which the pin 6 will bear upon the return of the drawer, the pawl being thus held in engagement with the rack.

In Figs. 14 and 15 I illustrate a construction wherein two coins must be deposited in order to raise the slide to an extent sufficient to permit the gravity-pawl 29 to swing clear of the rack 23. In this case I form the pawl-tripping slide 30 with an inclined face, 7$^a$, in addition to its face 7, and with a flange, c$^a$, in addition to its flange c, and I make the face 5 of the rack 23 longer than in the construction shown in the other figures of the drawings, and I prefer that this face 5 should be somewhat concave.

In operation the first coin deposited will raise the pawl-tripping slide, so that the pin or projection 6 will drop from the face 7 to the face 7$^a$, while the second coin will again raise the slide and the pin will clear the face 7$^a$ and the pawl drop free of the rack.

Having thus described my invention, I claim as new and desire to secure by Letters Patent—

1. A stationary toothed rack, a reciprocating slide, and a gravity-pawl pivoted to said slide, which engages said rack, said slide having a reciprocating movement greater than the length of said rack, whereby when said slide reaches its limit of motion in either direction said pawl will, under the influence of gravitation, swing clear of said rack, in combination with a pawl-tripping slide located at the rear of said rack in the path of said gravity-pawl, said slide normally holding said pawl in engagement with said rack, substantially as set forth.

2. A stationary toothed rack, a reciprocating slide, and a gravity-pawl pivoted to said slide, which engages said rack, said slide having a reciprocating movement greater than the length of said rack, whereby when said slide reaches its limit of motion in either direction said pawl will, under the influence of gravitation, swing clear of said rack, in combination with a gravity-pawl-tripping slide in the rear of said rack, said pawl in its lowermost position being in the path of said gravity-pawl so as to hold said pawl in engagement with said rack, but when said pawl-tripping slide is in its upper position it is disengaged from said pawl, whereby said pawl is free to swing clear of said rack, substantially as set forth.

3. A stationary toothed rack, a reciprocating slide, and a gravity-pawl pivoted to said slide, which engages said rack, said slide having a reciprocating movement greater than the length of said rack, whereby when said slide reaches its limit of motion in either direction said pawl will, under the influence of gravitation, swing clear of said rack, in combination with a pivoted lever and a pawl-tripping slide resting upon one end of said lever and co-operating with said gravity-pawl, substantially as set forth.

4. A stationary toothed rack, a reciprocating slide, and a gravity-pawl pivoted to said slide, which engages said rack, said slide having a reciprocating movement greater than the length of said rack, whereby when said slide reaches its limit of motion in either direction said pawl will, under the influence of gravitation, swing clear of said rack, in combination with a pivoted lever, a pawl-tripping slide resting upon one end of said lever and co-operating with said gravity-pawl, and a coin-chute for directing a coin onto the other end of said lever, substantially as set forth.

5. A stationary toothed rack, a reciprocating slide, and a gravity-pawl pivoted to said slide, which engages said rack, said slide having a reciprocating movement greater than the length of said rack, whereby when said slide reaches its limit of motion in either direction said pawl will, under the influence of gravitation, swing clear of said rack, and said slide having a laterally-projecting pin, in combination with a pawl-tripping slide in the rear of said rack and in the path of said projecting pin, substantially as set forth.

6. The combination, with a slide, of a pawl carried thereby and provided with a pin or projection, a rack with which the pawl engages, a pawl-tripping slide formed with an inclined face against which the pawl-pin normally rests, a lever arranged in connection with the tripping-slide, and a coin-chute arranged in connection with the lever, substantially as described.

7. The combination, with a slide, of a pawl connected thereto and provided with a pin or projection, a rack with which the pawl engages, a pawl-tripping slide formed with a bearing-face, 7, against which the pawl pin or projection normally rests, a lever arranged in connection with the tripping-slide and formed with fingers 9, and a chute arranged above the lever-fingers, substantially as described.

8. The combination, with a slide, of a pawl connected thereto and provided with a pin or projection, a rack with which the pawl engages, a pawl-tripping slide formed with a bearing-face, 7, against which the pawl pin or projection normally rests, and with a second bearing-face, $7^a$, a lever arranged in connection with the tripping-slide, and a chute arranged above the lever, substantially as described.

9. The combination, with a slide, of a pawl connected thereto and provided with a pin or projection, a rack with which the pawl engages, a pawl-tripping slide formed with a bearing-face, 7, and a flange, $c$, a lever arranged in connection with the tripping-slide, and a coin-chute arranged in connection with the lever, substantially as described.

10. The combination, with a slide, of a base-plate upon which the slide is mounted, a casting connected to the base-plate and formed with a side flange or rib, a rack, and a vertical way, a block connected to the slide and formed with a recess that is entered by the casting rib or flange, a pawl pivotally connected to the block and provided with a pin or projection, a pawl-tripping slide mounted in the vertical way and formed with an inclined face against which the pawl pin or projection bears, a lever arranged to bear against the lower end of the tripping-slide, and a coin-chute arranged in connection with the lever, substantially as described.

11. The combination, with a slide, of a base-plate upon which the slide is mounted, a casting connected to the base-plate and formed with a side flange or rib, a rack and a vertical way, a block connected to the slide and formed with a recess that is entered by the casting rib or flange, an angular arm, 46, which bears against the block, a spring arranged in connection with the arm, a pawl pivotally connected to the block and provided with a pin or projection, a pawl-tripping slide mounted in the vertical way and formed with an inclined face against which the pawl pin or projection bears, a lever arranged to bear against the lower end of the tripping-slide, and a coin-chute arranged in connection with the lever, substantially as described.

12. The movable slide, in combination with a pivoted arm, the swinging portion of which is in retractive engagement with said slide only when said slide is at and near its rearward position, and a retracting-spring acting upon said pivoted arm, substantially as set forth, whereby said spring acts to pull back said slide only during the latter portion of its rearward movement.

13. The reciprocating slide, in combination with the pivoted angular arm 46 and the spring 48, substantially as set forth.

14. A coin-chute having a lateral slot and being bent to form a recess having a horizontal shelf or bottom, in combination with an escapement-lever the two ends of which alternatively engage said slot and recess, respectively, substantially as set forth.

15. A vending-machine having a package-receptacle for containing the packages to be sold, in combination with a sliding package-drawer having a recess which constitutes a continuation of said package-receptacle when said drawer is closed, the front portion of said drawer extending above the bottom of said recess to a distance substantially equal to the thickness of one of the packages, and the rear portion of said drawer, which constitutes a platform upon which the packages in said package-receptacle rest when the drawer is open, extending above the bottom of said recess a distance less than the front portion of said drawer, substantially as set forth.

FRANK M. LEAVITT.

Witnesses:
G. W. FERRISS,
F. J. B. PAGE.